US011206254B2

(12) United States Patent
Nagao

(10) Patent No.: US 11,206,254 B2
(45) Date of Patent: Dec. 21, 2021

(54) UNMANNED VEHICLE MANAGEMENT SYSTEMS AND METHODS

(71) Applicant: Intertrust Technologies Corporation, Sunnyvale, CA (US)

(72) Inventor: Yutaka Nagao, San Jose, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 220 days.

(21) Appl. No.: 16/685,611

(22) Filed: Nov. 15, 2019

(65) Prior Publication Data

US 2020/0162449 A1    May 21, 2020

Related U.S. Application Data

(60) Provisional application No. 62/767,593, filed on Nov. 15, 2018.

(51) Int. Cl.
*H04L 29/06* (2006.01)
*G05D 1/00* (2006.01)
(Continued)

(52) U.S. Cl.
CPC ....... *H04L 63/0823* (2013.01); *G05D 1/0022* (2013.01); *H04L 9/3247* (2013.01);
(Continued)

(58) Field of Classification Search
CPC . H04L 63/0823; H04L 9/3247; H04L 9/3263; H04L 63/107; H04L 2209/84;
(Continued)

(56) References Cited

U.S. PATENT DOCUMENTS 9,870,566 B2    1/2018  Gong et al.
9,940,843 B2    4/2018  Gupta et al.
(Continued)

FOREIGN PATENT DOCUMENTS

WO    2019127486    7/2019

OTHER PUBLICATIONS

WO2019127486—Method and Apparatus for Controlling Unmanned Aerial Vehicle. SZ DJI Technology Co. Ltd. Geng, et al. Published Jul. 4, 2019. English Machine Translation.
(Continued)

*Primary Examiner* — Sher A Khan
(74) *Attorney, Agent, or Firm* — John P. Davis; Thayne and Davis LLC

(57) ABSTRACT

This disclosure relates to systems and methods for managing the operation of unmanned vehicles within policy managed locations and/or areas. In some embodiments, an unmanned vehicle may issue an operator signed request to enter a policy managed area and/or use a certain sensor system within a policy managed area to an unmanned vehicle management system. The unmanned vehicle management system may verify the operator's identity and associated rights with a trusted authority, identify a policy associated with the policy managed area, and enforce the identified policy in connection with generating a response to the request. In this manner, the use of unmanned vehicles and/or associated systems may be managed in accordance with certain policies and/or rules associated with a particular operating location and/or area.

15 Claims, 5 Drawing Sheets

(51) Int. Cl.
    *H04L 9/32*         (2006.01)
    *H04W 4/02*       (2018.01)
    *H04W 12/108*    (2021.01)
    *H04W 12/06*     (2021.01)

(52) U.S. Cl.
    CPC .......... *H04L 9/3263* (2013.01); *H04L 63/107* (2013.01); *H04W 4/02* (2013.01); *H04W 12/06* (2013.01); *H04W 12/108* (2021.01)

(58) Field of Classification Search
    CPC ....... H04W 12/06; H04W 4/02; H04W 12/37; G05D 1/0022
    See application file for complete search history.

(56) References Cited

U.S. PATENT DOCUMENTS

| | | | |
|---|---|---|---|
| 10,162,059 | B2 | 12/2018 | Ashoori et al. |
| 10,216,197 | B2 | 2/2019 | Zhang et al. |
| 10,310,515 | B2 | 6/2019 | Harvey |
| 2012/0022719 | A1* | 1/2012 | Matos .................. G05D 1/0808 701/2 |
| 2013/0212659 | A1* | 8/2013 | Maher .................. G05D 1/0022 726/6 |
| 2013/0217331 | A1* | 8/2013 | Manente ................ H04W 4/80 455/41.2 |
| 2015/0323930 | A1* | 11/2015 | Downey ............... G08G 5/0026 701/2 |
| 2016/0189548 | A1 | 6/2016 | Thurling et al. |
| 2016/0291589 | A1* | 10/2016 | Ashoori .................... G01S 1/08 |
| 2017/0178518 | A1 | 6/2017 | Foladare et al. |
| 2017/0309191 | A1* | 10/2017 | Marcus ................ G08G 5/0078 |
| 2018/0090012 | A1 | 3/2018 | Jo et al. |
| 2018/0157250 | A1* | 6/2018 | Barnickel ............... H04L 67/12 |
| 2018/0165970 | A1 | 6/2018 | Namgoong et al. |
| 2019/0051190 | A1* | 2/2019 | Russell .................. G06Q 10/06 |
| 2019/0251850 | A1 | 8/2019 | Stewart et al. |
| 2019/0266899 | A1 | 8/2019 | Ringer et al. |
| 2020/0117183 | A1* | 4/2020 | Moon .................... G01P 15/00 |

OTHER PUBLICATIONS

"Survey on UAV Cellular Communications: Practical Aspects, Standardization, Advancements, Regulation, and Security Challenges." Fotouhi, et al. IEEE Journal of Communications Surveys and Tutorials. Published Mar. 31, 2019.

\* cited by examiner

UNMANNED VEHICLE MANAGEMENT SYSTEMS AND METHODS

RELATED APPLICATION

This application claims the benefit of priority under 35 U.S.C. § 119(e) to U.S. Provisional Patent Application No. 62/767,593, filed Nov. 15, 2018, and entitled "Unmanned Vehicle Management Systems and Methods," which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for managing unmanned vehicles. More specifically, but not exclusively, the present disclosure relates to systems and methods for managing unmanned vehicle operation when a vehicle is located within a policy managed area.

Autonomous, semi-autonomous, and/or remote-controlled vehicles, which may be collectively described herein as unmanned vehicles, are progressively being used in a variety of business and personal contexts. For example, unmanned aerial vehicles, such as remote-controlled aerial drones, may be used for surveying, news reporting, environmental sensing, and/or disaster recovery operations. Remote-controlled aerial drones are also commonly used by photography hobbyists to capture still and video images that would be otherwise difficult to obtain.

The proliferation of unmanned vehicles has introduced a variety of privacy and/or safety-related concerns. For example, an individual may not wish to be photographed and/or otherwise recorded while in their private backyard by others without their consent. An individual, however, may more likely to be willing to allow for the collection of environmental data such as wind speed, temperature, and/or air pollution levels in their proximity, as such activities may introduce fewer privacy concerns than being photographed. Moreover, the operation of unmanned vehicles and/or associated sensors within certain geographic areas may be restricted to operators having certain credentials and/or licenses. For example, operation of unmanned aerial vehicles near airports may be restricted to licensed aviation officials and/or operation of unmanned vehicles near active wildfires may be restricted to licensed firefighting professionals.

Consistent with embodiments disclosed herein, autonomous, semi-autonomous, and/or remotely controlled vehicles may be managed in accordance with one or more policies. In certain embodiments, the polices may be associated with policy managed locations and/or areas. An unmanned vehicle may issue a request to enter a policy managed area and/or use a certain sensor system within a policy managed area to an unmanned vehicle management system. The unmanned vehicle management system may identify a policy associated with the policy managed area, and enforce the identified policy in connection with generating a response to the request. In this manner, the use of unmanned vehicles and/or associated systems (e.g., sensor systems, camera systems, and/or the like) may be managed in accordance with certain policies and/or rules associated with a particular operating location.

In certain embodiments, the unmanned vehicle and/or an unmanned vehicle management system may authenticate an unmanned vehicle and/or a user thereof in connection with policy identification and/or enforcement decisions. For example, in some embodiments, requests issued from an unmanned vehicle may be signed with a key associated with an operator of the unmanned vehicle. An unmanned vehicle management system may authenticate the request by verifying the associated signature and may perform policy identification and/or enforcement decisions based on the same. In certain embodiments, signature verification processed performed by the unmanned vehicle management system may include issuing requests to a trusted service and/or authority and/or processing associated responses received from the trusted service.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure but is merely representative of possible embodiments of the disclosure. In addition, the steps of any method disclosed herein do not necessarily need to be executed in any specific order, or even sequentially, nor need the steps be executed only once, unless otherwise specified.

A variety of autonomous, semi-autonomous, and/or remote-controlled vehicles may be used in different business and personal contexts. Consistent with various aspects of the disclosed embodiments, the operation of unmanned vehicles may be managed in accordance with one or more policies. In some embodiments, an unmanned vehicle management system may identify one or more policies associated with a policy managed location and/or area and enforce the identified policies in connection with the operation of an unmanned vehicle and/or or more of its subsystems (e.g., sensor systems, camera systems, and/or the like).

Figure 1:
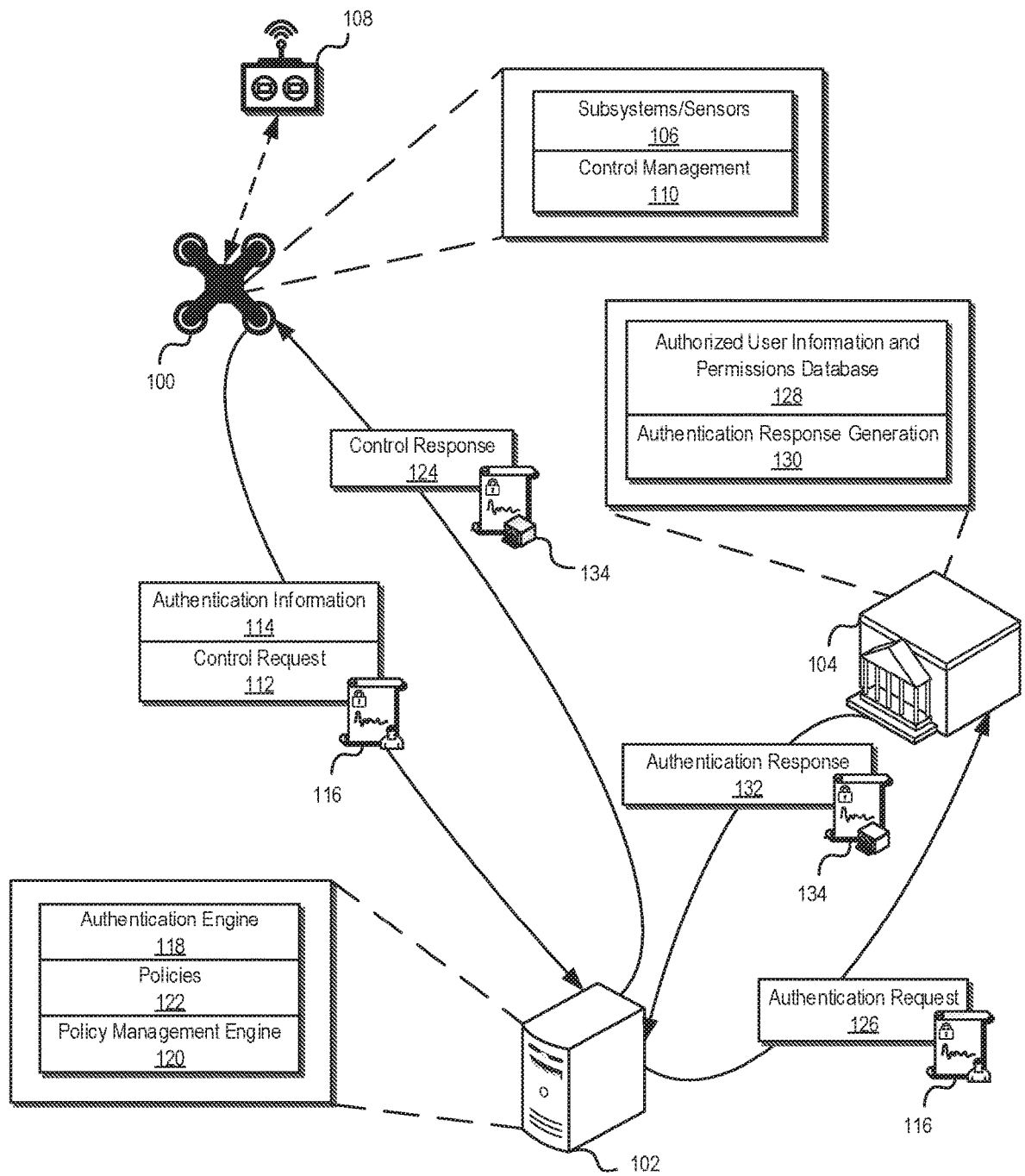
FIG. 1 illustrates an example of an interaction between an unmanned vehicle, an unmanned vehicle management system, and a trusted service consistent with certain embodiments of the present disclosure.

FIG. 1 illustrates an example of an interaction between an unmanned vehicle 100, an unmanned vehicle management system 102, and a trusted service 104 consistent with certain embodiments of the present disclosure. Consistent with various disclosed embodiments, an unmanned vehicle 100 may comprise, for example and without limitation, one or more unmanned aerial vehicles ("UAVs") including aerial drones, unmanned land-based vehicles, unmanned overwater vessels, unmanned underwater vessels, and/or any other type of unmanned vehicle configured to transit any type of environment and/or operate via autonomous, semi-autonomous, and/or remote control and/or combinations thereof. It will be appreciated that a variety of types of unmanned vehicles may be used in connection with the disclosed systems and methods.

Unmanned vehicles 100 may be associated with and/or otherwise incorporate a variety of subsystems including one or more sensor systems 106. For example, an unmanned vehicle 108 may include one or more video and/or still image sensors and/or cameras, environmental sensors (e.g., air quality and/or particulate sensors, wind speed sensors, temperature sensors, etc.), and/or the like. It will be appreciated that various disclosed embodiments may be used in connection with unmanned vehicles incorporating a variety of sensor systems. In certain instances, sensors included in an unmanned vehicle may be generally described herein as a subsystem of the unmanned vehicle 100. Further vehicle subsystems 108 may include systems configured to control and/or otherwise facilitate movement of the unmanned vehicle 100 (e.g., motors, control surfaces, and/or the like).

In some embodiments, various operations of the unmanned vehicle 100 and/or subsystems and/or sensors associated with the vehicle 100 may be controlled, at least in part, using a control device 108. In some embodiments, the control device 108 may comprise a special-purpose and/or otherwise discrete control device configured to control, at least in part, various operations of the unmanned vehicle 100. In further embodiments, the control device 108 may comprise a more general purpose computing device such as, for example and without limitation, a mobile device (e.g., a smartphone, a tablet computing system, and/or the like), configured to execute software allowing a user of the control device 108 to operate the unmanned vehicle 100. In some embodiments, the control device 108 may further interface with one or more accessory control devices (e.g., joysticks, buttons, and/or other suitable control devices and/or interfaces) to receive user input in connection with operating the unmanned vehicle 100.

As discussed in more detail below, in some embodiments, an operator of the unmanned vehicle 100 may provide certain credentials via the control device 108 to authenticate their identity and/or associate permissions to operate the unmanned vehicle 100. Although various illustrated embodiments and examples described herein may include a control device 108, it will be appreciated that in further embodiments, an unmanned vehicle 100 may be designed to operate autonomously and/or semi-autonomously and may not necessarily interface with a control device 108 in connection with vehicle operations.

In certain embodiments, the unmanned vehicle 100, unmanned vehicle management system 102, trusted service 104, control device 108, and/or any other related device, service, and/or system may comprise one or more computing and/or processing devices, systems, and/or subsystems, including any processing and/or computing system suitable to implement various embodiments of the systems and methods disclosed herein. For example, the unmanned vehicle management system 102, trusted service 104, and/or control device 108 may comprise a variety of computing devices and systems, including laptop computer systems, desktop computer systems, server computer systems, microcomputing systems, distributed computer systems, smartphones and/or other mobile devices, tablet computers, and/or the like. In various embodiments, the unmanned vehicle 100 may comprise one or more control computing systems configured to control operations of the unmanned vehicle 100 consistent with aspects of the disclosed embodiments.

In certain embodiments, the unmanned vehicle 100, unmanned vehicle management system 102, trusted service 104, and/or control device 108 may comprise at least one processor system configured to execute instructions stored on an associated non-transitory computer-readable storage medium. As discussed in more detail below, the unmanned vehicle 100, unmanned vehicle management system 102, trusted service 104, and/or control device 108 may further comprise a secure processing unit ("SPU") configured to perform sensitive operations such as trusted credential and/or key management, user information management, digital signature and/or other cryptographic operations, secure policy management, and/or other aspects of the systems and methods disclosed herein. The unmanned vehicle 100, unmanned vehicle management system 102, trusted service 104, and/or control device 108 may further comprise software and/or hardware configured to enable electronic communication of information between the devices, services, and/or systems via the network using any suitable communication technology and/or standard.

The unmanned vehicle 100, unmanned vehicle management system 102, trusted service 104, control device 108, and/or associated systems, devices, and/or services may be communicatively coupled using a variety of networks and/or network connections. In certain embodiments, the network may comprise a variety of network communication devices and/or channels, and may utilize any suitable communications protocols and/or standards facilitating communication between the unmanned vehicle and/or the unmanned vehicle management system.

In some embodiments, the network may comprise the Internet, a local area network, a virtual private network, and/or any other communication network utilizing one or more electronic communication technologies and/or standards (e.g., Ethernet or the like). In some embodiments, the network may comprise a wireless carrier system such as a personal communications system ("PCS"), and/or any other suitable communication system incorporating any suitable communication standards and/or protocols. In further embodiments, the network may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network may incorporate one or more satellite communication links. In yet further embodiments, the network may utilize IEEE's 802.11 standards, Bluetooth®, ultra-wide band ("UWB"), Zigbee®, and or any other suitable standard or standards.

As illustrated in connection with FIG. 1, a vehicle control management module 110 may execute on the unmanned vehicle 100. In certain embodiments, the vehicle control management module 110 may control various operations of the unmanned vehicle 100. In some embodiments, the vehicle control management module 110 may engage in various policy managed operating decisions consistent with aspects of the disclosed embodiments. For example, the vehicle control management module 110 may engage in certain policy managed operating decisions relating to the operation and/or movement of the vehicle 100 within a policy managed location and/or the use of certain vehicle subsystems and/or sensors 106 within a policy managed location.

For example, in some embodiments, the vehicle control management module 110 may determine that the unmanned vehicle 100 has entered, has received commands from the control device 108 indicating a user would like the vehicle 100 to enter (e.g., is being controlled to enter), and/or is otherwise approaching and/or within a policy managed location and/or area. In further embodiments, the vehicle control management module 110 may determine that the unmanned vehicle 100 and/or a user thereof would like to use a particular subsystem of the vehicle within a policy managed location and/or area (e.g., by providing commands to the vehicle 100 via the control device 108).

Consistent with embodiments disclosed herein, the unmanned vehicle 100 may communicate a control request 112 to the unmanned vehicle management system 102. The control request 112 may comprise a request to operate the unmanned vehicle 100 and/or a subsystem 106 thereof within a policy managed location and/or area. For example, in some embodiments, the control request 112 may comprise a request to enter a policy managed location and/or area. In further embodiments, the control request 112 may comprise a request to use a subsystem and/or sensor 106 of the unmanned vehicle 100 (e.g., a camera and/or other sensor) within a policy managed location and/or area. In certain embodiments, the control request 112 may comprise an indication of current location of the unmanned vehicle 100 (e.g., latitude, longitude, altitude, etc.), an intended future position of the unmanned vehicle 100, and/or an intendent path of travel of the unmanned vehicle 100.

In some embodiments, control requests 112 may be generated and/or issued to the unmanned vehicle management system 102 based on receipt of a command from the control device 108 (e.g., user input) and/or control actions engaged by the vehicle control management module 110. In certain embodiments, control requests 112 may be generated without a determination that an associated control action impacts and/or otherwise involves a policy managed location and/or area.

In further embodiments, control requests 112 may be generated based on trigging of an applicable policy. For example, the unmanned vehicle 100 and/or the vehicle control management module 110 may be provisioned with policy information (e.g., provisioned by the unmanned vehicle management system 102, trusted service 104, and/or another system and/or service). In some embodiments, the provisioned policy information may delineate one or more policy managed areas and/or locations. In response to receiving a command from the control device 108 and/or control actions engaged in by the vehicle control management module 110 that would cause the unmanned vehicle 100 to enter a policy managed area and/or location and prior to engaging in such a actions, a control request 112 may first be generated and issued to the unmanned vehicle management system 102 from the unmanned vehicle 100.

As part of and/or separate from the control request 112, the unmanned vehicle 100 may further communicate authentication information to the unmanned vehicle management system. The authentication information 114 may comprise information that identifies and/or otherwise may be used to authenticate the unmanned vehicle 100 and/or a user and/or operator thereof with the unmanned vehicle management system 102 and/or other systems and/or services (e.g., the trusted service 104). For example, in some embodiments, the unmanned vehicle 100 may transmit identification information associated with the vehicle control management module 110 that uniquely identifies the unmanned vehicle 100. In further embodiments, the authentication information 114 may comprise information that uniquely identifies and/or provides an indication of an identity of an operator of the unmanned vehicle 100 associated with a control request 112. It will be appreciated that a variety of types of authentication information 114 may be used in connection with the disclosed systems and methods to authenticate an unmanned vehicle 100 and/or an associated user with the unmanned vehicle management system 102.

In some embodiments, control requests 112 issued by the unmanned vehicle 100 may be signed and/or otherwise associated with a digital signature 116. In some embodiments, the digital signature 116 may be uniquely associated with the unmanned vehicle 100. In further embodiments, the control request 112 may be signed and/or otherwise include a digital signature 116 associated with a user and/or operator of the unmanned vehicle 100. For example, in some embodiments, an operator of the unmanned vehicle 100 may provide the unmanned vehicle 100 and/or the associated control device 108 with authorization credentials associated with their identity.

In some embodiments, the authorization credentials may be associated with and/or comprise a cryptographic key unique to the operator that may be used to digitally sign control requests 112 generated based on the operator's interactions with the control device 108 and/or the unmanned vehicle 100 (e.g., control actions and/or the like). For example, an operator of the vehicle may provide credentials to the unmanned vehicle 100 and/or the control device 108 using a near-field communication ("NFC") card and/or or wireless device (e.g., a smart phone), a Universal Serial Bus ("USB") and/or other portable storage device, and/or the like. In some embodiments, these credentials may comprise the operator's cryptographic signing key (e.g., a private signing key).

In further embodiments, the authorization credentials may be used to access and/or otherwise retrieve the cryptographic key unique to the operator of the unmanned vehicle 100. For example, the user may provide a username, operator identification, and/or password information that, if validated, may be used to access the operator's cryptographic signing key. Control requests 112 that are cryptographically signed and/or otherwise include a digital signature associated with a user and/or operator of the unmanned vehicle 100 may be trusted as being generated based on a control action requested from the user and/or operator associated with the digital signature.

An authentication engine 118 executing on the unmanned vehicle management system 102 may authenticate the unmanned vehicle 100, a user and/or operator thereof, and/or the control request 112 based on the received authentication information 114 and/or the digital signature 116 associated with the control request 112. In certain embodiments, and as is discussed in more detail below, as part of and/or in addition to this authentication process, the unmanned vehicle management system 102 and/or the authentication engine 118 may communicate with a trusted service 102 to authenticate user and/or operator identity and/or permissions associated with a digital signature 116 and/or a signed control request 112.

Once authenticated, a policy management engine 120 executing on the unmanned vehicle management system 102 may identify one or more policies 122 associated with the control request 112 and/or the authentication information 114. In some embodiments, the policy management engine 102 may identify, based on the control request 112, a location associated with the control request 112 e.g., a current and/or intended location of the unmanned vehicle). In some embodiments, the control request 112 may comprise an explicit indication one or more locations associated with the control request 112 (e.g., current location, future locations, etc.). In further embodiments, the control request 112 may comprise one or more paths of travel associated with a control request 112.

The policy management engine 120 may determine whether the identified location corresponds with a policy managed location and/or area—that is, a location and/or area triggering application of and/or enforcement of one or more policies 122. If a policy 122 is identified, the policy management engine 120 may enforce the policy 122 in connection with generating a response 124 to the control request 112. For example, the policy management engine 120 may determine that the control request 112 comprises a request to operate a camera system of an unmanned vehicle 100 while the vehicle 100 is in a policy managed location where camera operation is restricted to a particular list of users. Based on associated authentication information 114 associated with the request 112 (and/or a digital signature 116 associated with the same), the policy management engine 120 and/or the authentication engine 118 may determine that the request 112 was issued by one of the listed authorized users. In response to this determination, the policy management engine 120 may generate a control response 124 granting permission for the unmanned vehicle 100 to use the camera system within the policy managed location. Upon receipt of the control response 124, the unmanned vehicle 100 may engage in the requested control action.

In certain embodiments, as part of and/or in addition to unmanned vehicle, user, and/or operator authentication processes performed by the authentication engine 118 and/or the unmanned vehicle management system 102, the received authentication information 114 and/or one or more digital signatures 116 associated with the control request 112 may further be verified by a trusted service 104 and/or other authority. For example, as illustrated, the unmanned vehicle management system 102 may transmit a request 126 to a trusted service 104 to authenticate a digital signature 116 associated with the user and/or operator of the unmanned vehicle 100 that generated the control request 112.

In some embodiments, the trusted service 104 may operate as a trusted authority providing information relating to user and/or operator identities and/or associated permissions. In certain embodiments, the trusted service 104 may be associated with authorities that may regulate and/or otherwise license unmanned vehicle users and/or operators. In one non-limiting example, the trusted service 104 may be associated with aviation regulatory authorities that may provide certain licensing for aerial unmanned vehicle operators. In another non-limiting example, the trusted service 104 may be associated with a wildland firefighting authority that may license unmanned vehicle operators that may wish to operate unmanned vehicles in active wildfire areas.

To verify one or more digital signatures 116 associated with a control request 112 and/or associated authentication information 114, the unmanned vehicle management system 102 may transmit an authentication request 126 to the trusted service 104. In some embodiments, the authorization request 126 may comprise the digital signature 116 and/or information relating to the digital signature 116 received in connection with the control request 112.

As a trusted authority, the trusted service 104 may maintain a database 128 that includes information relating to authorized unmanned vehicle users and/operators (e.g., cryptographic keys, digital signature information, etc.) and/or policies and/or operational permissions associated with the authorized users and/or operators. In certain embodiments, an authentication response generation module 130 executing on the trusted service 104 may process authorization requests 126 received by the trusted service 104 and generate associated responses 132. For example, in some embodiments, the trusted service 104 may determine that a cryptographic signature 116 associated with an authentication request 126 was generated by an authorized vehicle operator by comparing the signature 116 with information included in the database 128 and may generate a authentication response 132 indicative of the same. In some embodiments, the authentication response 132 may further comprise permissions and/or policy information associated with the subject operator included in the database 128 (e.g., authorized vehicle operation rights, permissions, and/or the like).

In certain embodiments, generated authentication responses 132 may be signed and/or otherwise include a cryptographic digital signature 134 associated with the trusted service 104. For example, the trusted service 104 may sign authentication responses 132 with a cryptographic key associated with the trusted service 104 (e.g., a private cryptographic signing key) that may be used by recipients of the responses 132 to authenticate that the responses 132 originated from and/or otherwise were generated by the trusted service 104. Accordingly, in some embodiments, the unmanned vehicle management system 102 may verify the authenticity of the received authentication responses 132 by verifying a signature 134 associated with the response 132.

In some embodiments, the unmanned vehicle management service 102 may generate a control response 124 based, at least in part, on the authentication response 132 received from the trusted service 104 (e.g., after verifying the signature 132 associated with the response 132). In certain embodiments, the control response 124 may comprise a signature 134 associated with the trusted service 104 and/or the unmanned vehicle management service 102. In some embodiments, the unmanned vehicle 100 and/or the associated control device 108 may comprise secure hardware and/or software configured to control whether control actions are performed based on the successful verification of the presence of and/or validation of signature information associated with the trusted service 104 and/or the unmanned vehicle management system 102 included in received control responses 124.

Policies and/or permissions may be applied and/or otherwise enforced by a variety of devices, systems, and/or services and/or at a variety of levels in connection with the illustrated unmanned vehicle management architecture. For example, in some embodiments, policies may be enforced by the unmanned vehicle 100 and/or associated control device 108, the unmanned vehicle management system 102, and/or the trusted service 104. It will be appreciated that policy and/or permission enforcement consistent with various aspects of the disclosed embodiments may be performed in a variety of ways, and that any suitable policy and/or permission enforcement mechanism may be used in connection with the disclosed embodiments.

As described above, in some embodiments, policies may associate one or more locations and/or areas with one or more users and/or entities. For example, Table I below shows a non-limiting example of policy information associating a location bounded by a particular latitude and longitude with associated entities (e.g., owner, family of owner, and/or other entities associated with the articulated policy).

TABLE I

| Land Parcel | Land Owner | Family | Delegated Entity |
|---|---|---|---|
| Lat = A<br>Lat = B<br>Long = C<br>Long = D | John Smith | Tom Smith<br>Kate Smith | Real Estate<br>Municipal Officer |

Policy information may further associate one or more entities with permission information relating to the operation one or more subsystems of an unmanned vehicle within the policy managed location and/or area. Table II below shows a non-limiting example of policy information associating one or more entities with permissions information relating to the operation of one or more unmanned vehicle sensors within a policy managed location and/or area.

TABLE II

| | Camera | Video | Wind Sensor | Pollution Sensor |
|---|---|---|---|---|
| Land Owner | OK | HD | OK | OK |
| Family | OK | SD<br>9am-5pm | OK | OK |
| Delegated Entity | 3M Pixel or lower<br>12pm-1pm | No | OK | OK |

In the above example, Tom Smith—associated with a family member entity—may be permitted to activate a video camera of an unmanned vehicle 100 within the policy managed location between 9:00 AM and 5:00 PM to record standard definition ("SD") quality video. A real estate agent—a delegated entity under the policy—may activate a still camera of an unmanned vehicle 100 within the policy managed location between 12:00 PM and 1:00 PM to record images of three megapixels or less. Finally, a municipal officer—a delegated entity under the policy—may activate a wind sensor and/or a pollution sensor of an unmanned vehicle 100 at any time within the policy managed location.

It will be appreciated that control requests 112, authentication information 114, policies 122, and/or control responses 124 may comprise a variety of types of information used in connection with various user and/or entity authentication and/or policy management control decisions consistent with various aspects of the disclosed embodiments. Similarly, authentication requests 126 and/or responses 132 issued to a trusted service 104 may comprise a variety of types of information used in connection with various user and/or entity authentication and/or policy management control decisions consistent with various aspects of the disclosed embodiments.

In at least one nonlimiting example implementing certain aspects of the disclosed embodiments, unmanned vehicle 100 comprising an aerial drone may be flying over a house. A user of the drone may wish to take a photo of the house. A client control management application 110 executing on the aerial drone and/or an associated system (e.g., a control device 108) may communicate a control request 112 to the unmanned vehicle management system 112 that includes one or more of identity information and/or an associated digital signature 116 associated with the user, the client application 110, and/or the aerial drone, a current latitude, longitude, and/or altitude of the aerial drone, information relating to the camera system (e.g., camera ID information and/or specification information), and/or other information used in connection with policy management decisions (e.g., current vehicle travel direction and/or speed).

Upon receipt of the control request 112 and/or associated authentication information 114, the unmanned vehicle management system 102 may verify the identity of the user, control management application 110, and/or drone by verifying the digital signature 116 and/or other authentication information 114. In some embodiments, the unmanned vehicle management system 102 may interact with the trusted service 102 in connection with digital signature verification operations, as described above. The unmanned vehicle management system 102 may identify a policy managed location and/or an associated policy associated with the location of the aerial drone.

The policy associated with the policy managed location may be enforced by the unmanned vehicle management system 102. For example, the system 102 may determine whether a user associated with the authentication information 114 and/or the digital signature 116 matches an entity associated with the policy (e.g., a landowner, family, and/or delegated entity). The unmanned vehicle management system 102 may then check permissions associated with the identified entity included the policy against the control request 112, and issue a control response 124 based on the identified policy. The aerial drone may receive the control response 124, and a control management application 110 executing thereon may allow for the drone to operate in accordance with the control response 124 (e.g., allowing the user to activate a camera system of the drone if allowed by the enforced policy).

It will be appreciated that a number of variations can be made to the architecture, relationships, and examples presented in connection with FIG. 1 within the scope of the inventive body of work. For example, certain device, system, and/or service functionalities described above may be integrated into a single device, system, and/or service, and/or any suitable combination of devices, systems, and/or services in any suitable configuration. Indeed, certain functionalities of the unmanned vehicle 100, control device 108, the unmanned vehicle management service 102, and/or the trusted service 104 may be integrated into a single system, multiple systems, and/or any suitable combination of systems. Thus, it will be appreciated that the architecture, relationships, and examples presented in connection with FIG. 1 are provided for purposes of illustration and explanation, and not limitation.

Figure 2:
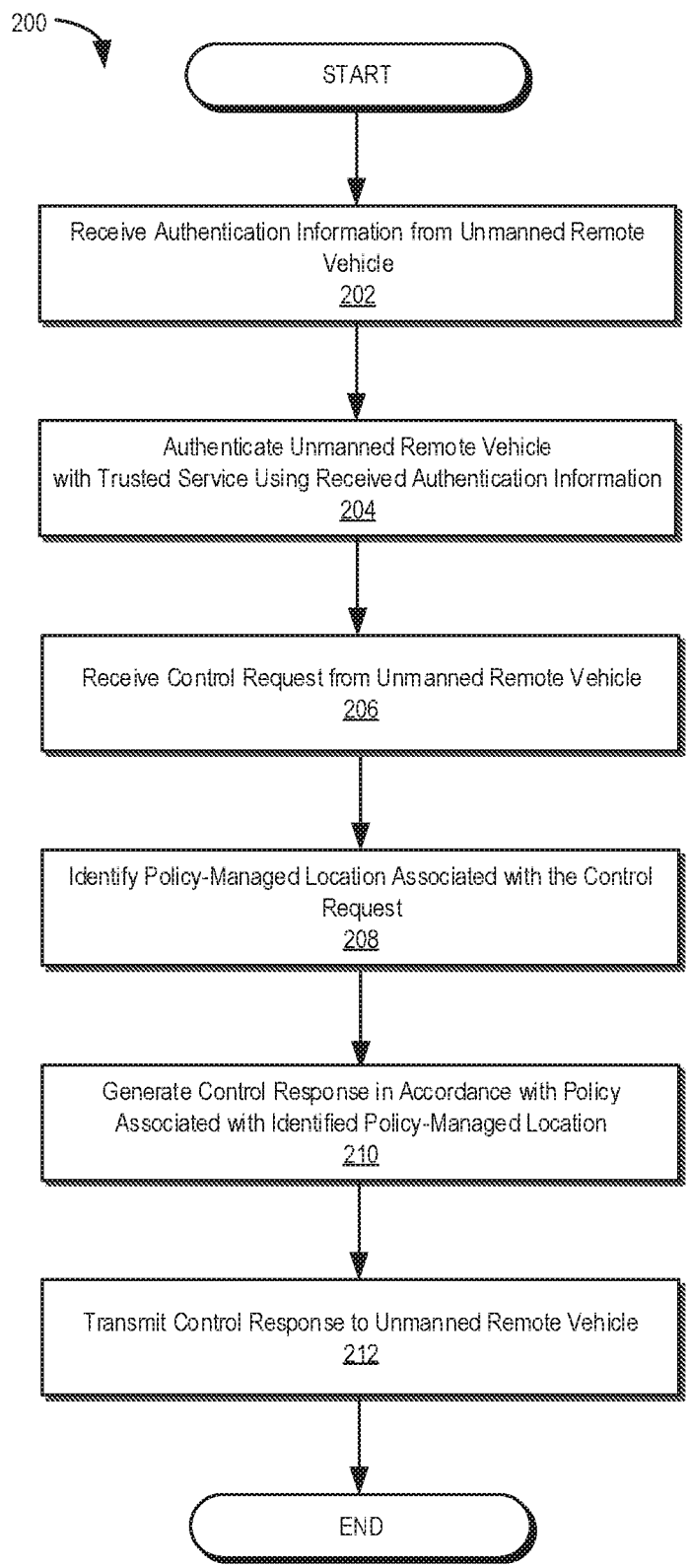
FIG. 2 illustrates a flow chart of an example of a method for managing operations of an unmanned vehicle consistent with certain embodiments of the present disclosure.

FIG. 2 illustrates a flow chart of an example of a method 200 for managing operations of an unmanned vehicle consistent with certain embodiments of the present disclosure. The illustrated method 200 may be implemented in a variety of ways, including using software, firmware, and/or any combination thereof. In certain embodiments, various aspects of the illustrated method and/or one or more of its constituent steps may be performed by an unmanned vehicle, an unmanned vehicle management system, a trusted service, and/or any suitable combination of one or more services and/or computer systems.

At 202, authentication information may be received from an unmanned vehicle and/or a system and/or device associated with the same (e.g., a remote-control device associated with an unmanned vehicle). The authentication information may comprise information that identifies and/or otherwise may be used to authenticate the unmanned vehicle and/or a user thereof with the unmanned vehicle management system.

Based on the received authentication information, an unmanned vehicle management system may authenticate the unmanned remote vehicle and/or a user thereof at 204. For example, in certain embodiments, the unmanned vehicle management system may authenticate a user of the unmanned vehicle with a trusted service and/or other trusted authority based, at least in part, on the received authentication information. In further embodiments, the unmanned vehicle management system may authenticate the unmanned remote vehicle and/or the associated user independently.

A control request may be received from the unmanned remote vehicle at 206. In some embodiments, the control request may comprise a request to enter and/or operate the vehicle in a policy managed location and/or area. In certain embodiments, the control request may include an indication of a current location of the unmanned vehicle (e.g., latitude, longitude, altitude, etc.), an intended future position of the unmanned vehicle, an intended path of travel of the unmanned vehicle, and/or the like. In further embodiments, the control request may comprise a request to use a subsystem of the unmanned vehicle such as a camera and/or other sensor and/or subsystem of the vehicle.

At 208, based on the control request, a policy managed location and/or an associated policy may be identified. For example, it may be determined that an indicated current location and/or an intended future position of the unmanned vehicle corresponds with a policy managed location and/or area, and a policy associated with the location and/or area may be identified. The identified policy may be enforced in connection with generating a control response at 210 based, at least in part, on the control request and/or the authentication information. For example, entity identification information included in the authentication information and a sensor activation request included in the control request may be compared against the identified policy to determine whether use of a requested sensor is permitted within the policy managed location and/or area by the entity associated with the identification information, and an associated control response may be generated.

The generated control response may be communicated to the unmanned remote vehicle at 212. In certain embodiments, a client control application executing on the unmanned remote vehicle may allow or restrict certain operations of the unmanned vehicle based, at least in part, on the control response.

Figure 3:
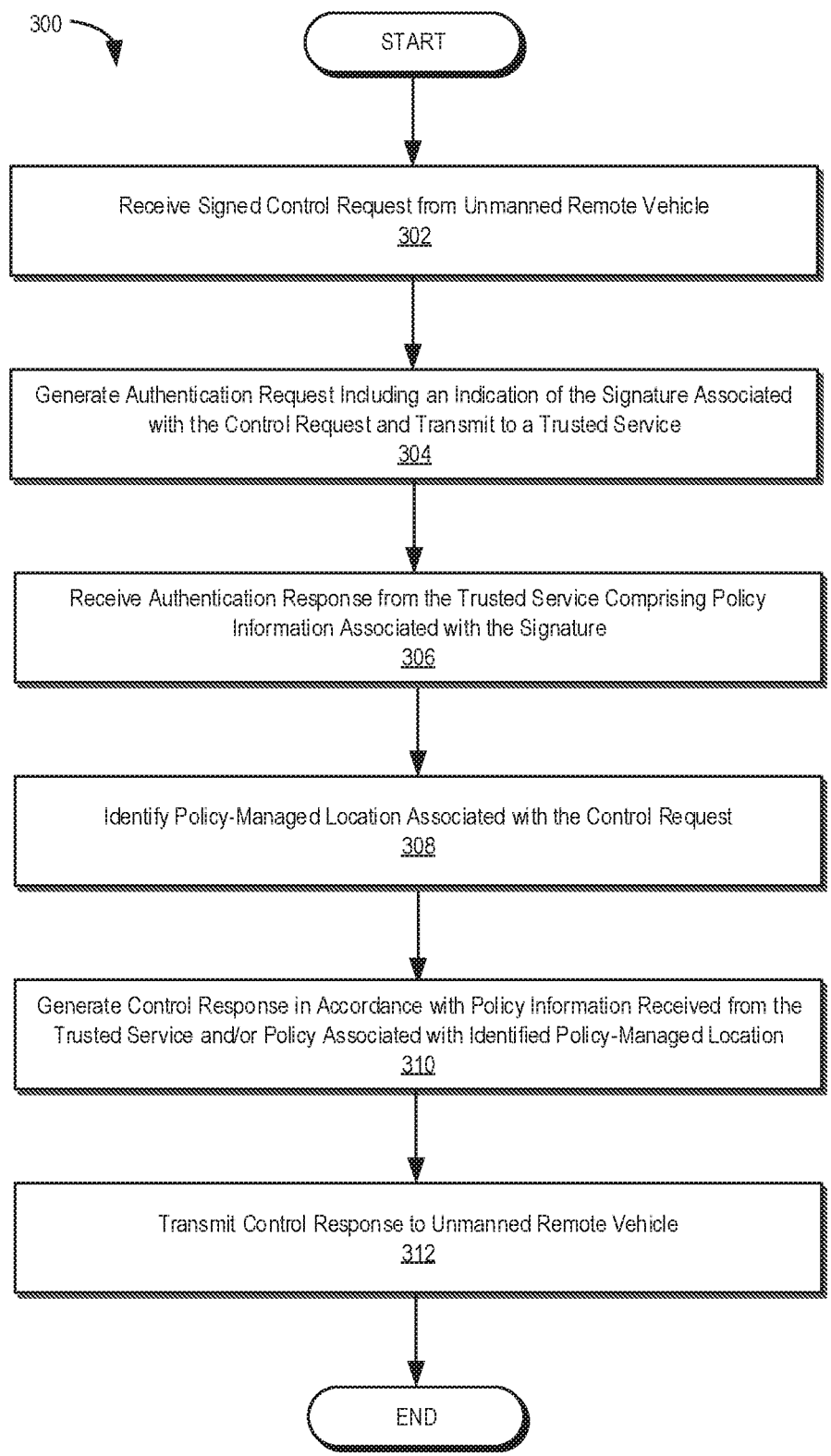
FIG. 3 illustrates a flow chart of an example of a method for managing operations of an unmanned vehicle using signature verification with a trusted service consistent with certain embodiments of the present disclosure.

FIG. 3 illustrates a flow chart of an example of a method 300 for managing operations of an unmanned vehicle using signature verification with a trusted service consistent with certain embodiments of the present disclosure. The illustrated method 300 may be implemented in a variety of ways, including using software, firmware, and/or any combination thereof. In certain embodiments, various aspects of the illustrated method and/or one or more of its constituent steps may be performed by an unmanned vehicle, an unmanned vehicle management system, a trusted service, and/or any suitable combination of one or more services and/or computer systems.

At 302, a signed control request may be received from the unmanned vehicle. In some embodiments, the control request may comprise an indication of a current location of the unmanned vehicle (e.g., latitude, longitude, altitude, etc.), an intended future position of the unmanned vehicle, an intended path of travel of the unmanned vehicle, and/or the like. In further embodiments, the control request may comprise a request to use a subsystem of the unmanned vehicle such as a camera and/or other sensor and/or subsystem of the vehicle.

Consistent with various aspects of the disclosed embodiments, the control request received at 302 may be signed and/or otherwise include a signature generated using a cryptographic key that may be associated with an operator of the unmanned vehicle that initiated a control action resulting in the generation of the received control request. In this manner, the signed control request and/or associated signature may provide an indication of an identity of a particular operator associated with the request.

To determine whether the operator associated with the control request is authorized to engage in the requested control action, an authorization request may be generated and transmitted to a trusted service at 304. In some embodiments, the authorization request may comprise the digital signature and/or information relating to the digital signature received in connection with the control request.

As a trusted authority, the trusted service may maintain a database that includes information relating to authorized unmanned vehicle users and/or operators (e.g., cryptographic keys, digital signature information, etc.) and/or policies and/or operational permissions associated with the authorized users and/or operators. At 306, an authentication response may be received from the trusted service indicating whether the digital signature and/or information relating to the digital signature communicated with the authorization request is associated with an authorized and/or licensed operator. The authentication response may further comprise permissions and/or policy information associated with an authorized operator.

In some embodiments, the authentication response may be signed and/or otherwise include a cryptographic digital signature associated with the trusted service that may be used to authenticate that the response was generated by the trusted service. In certain embodiments, the method 300 may further include verifying this signature associated with the received authentication response.

At 308 a policy managed location associated with the control request may be identified. As discussed above, the control request may comprise an indication of a current location of the unmanned vehicle (e.g., latitude, longitude, altitude, etc.), an intended future position of the unmanned vehicle, an intended path of travel of the unmanned vehicle, and/or the like. This location-based information may be compared with policy information associated with one or more policy managed locations to determine that the control request triggers policy information associated with a policy managed location.

Based, at least in part, on the identified policy information and/or policy and/or permission information associated with the verified operator received from the trusted service, a control response may be generated at 310. In some embodiments, the control response may include the digital signature associated with the trusted service received in connection with the authentication response at 306. The generated control response may then be communicated to the unmanned vehicle at 312.

Figure 4:
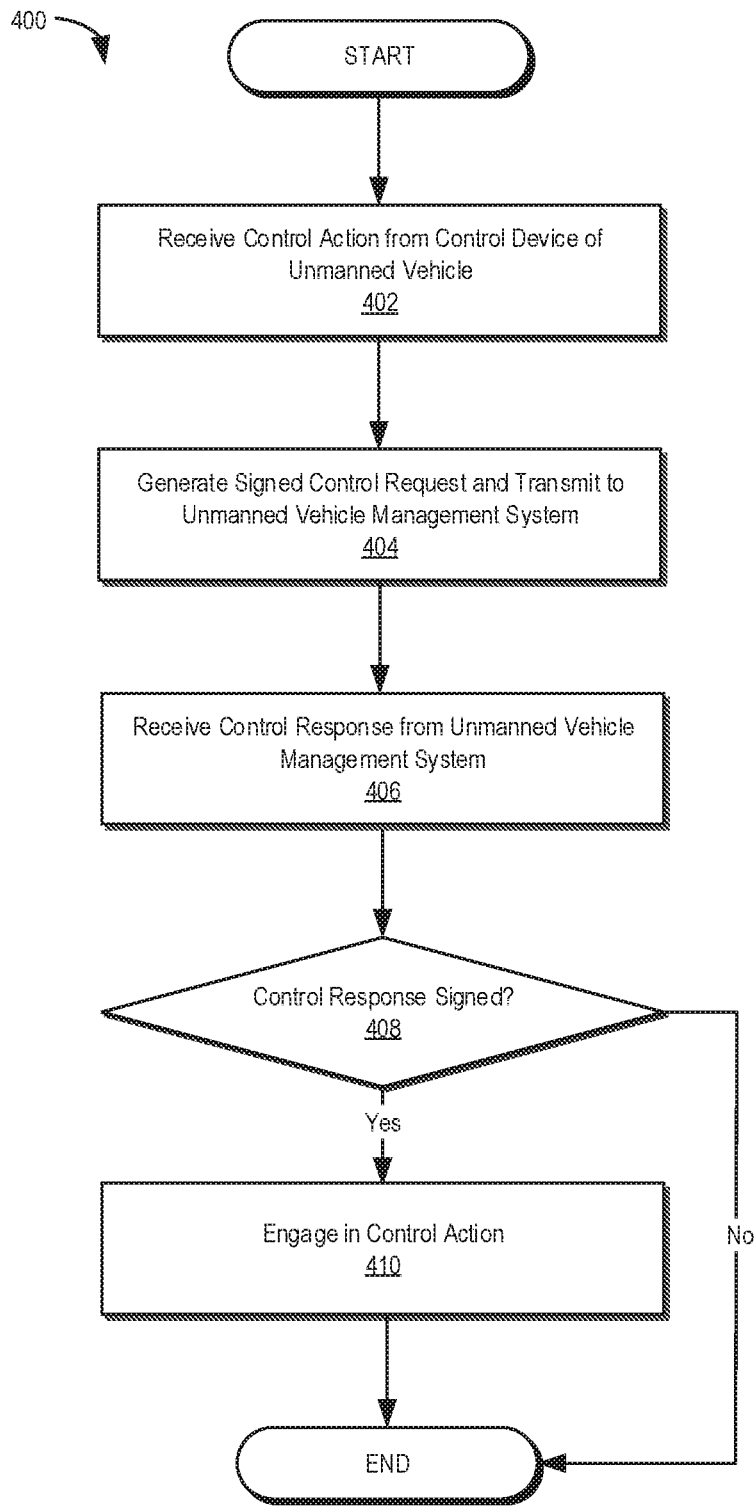
FIG. 4 illustrates a flow chart of an example of a method for managing control actions received by an unmanned vehicle consistent with certain embodiments of the present disclosure.

FIG. 4 illustrates a flow chart of an example of method 400 for managing control actions received by an unmanned vehicle consistent with certain embodiments of the present disclosure. The illustrated method 400 may be implemented in a variety of ways, including using software, firmware, and/or any combination thereof. In certain embodiments, various aspects of the illustrated method and/or one or more of its constituent steps may be performed by an unmanned vehicle, an unmanned vehicle management system, a trusted service, and/or any suitable combination of one or more services and/or computer systems.

At 400, a control action may be received. For example, a control action may be received by an unmanned vehicle from an operator interacting with a control device and/or any other suitable interface. In certain embodiments, the control action may comprise and/or otherwise be associated with authentication credentials associated with the operator. In further embodiments, authentication credentials associated with the operator may be received independent of the control action. The authentication credentials may comprise at least one cryptographic key and/or other information associated with the operator that may be used to generate a secure digital signature.

A signed control request may be generated at 404 based, at least in part, on the received control action. Consistent with various disclosed embodiments, the control request may be signed using the cryptographic key associated with the operator that initiated the control action. The signed control request may be transmitted to an unmanned vehicle management system.

At 406, a response to the control request may be received from the unmanned vehicle management system. The received response may be checked at 408 to determine whether the response has been signed and/or otherwise includes a digital signature associated with a trusted service and/or other trusted authority. If the response has been signed and/or includes the signature, the method 400 may proceed to 410 and the unmanned vehicle may engage in the control action 410. Otherwise, the method 400 may terminate.

Figure 5:
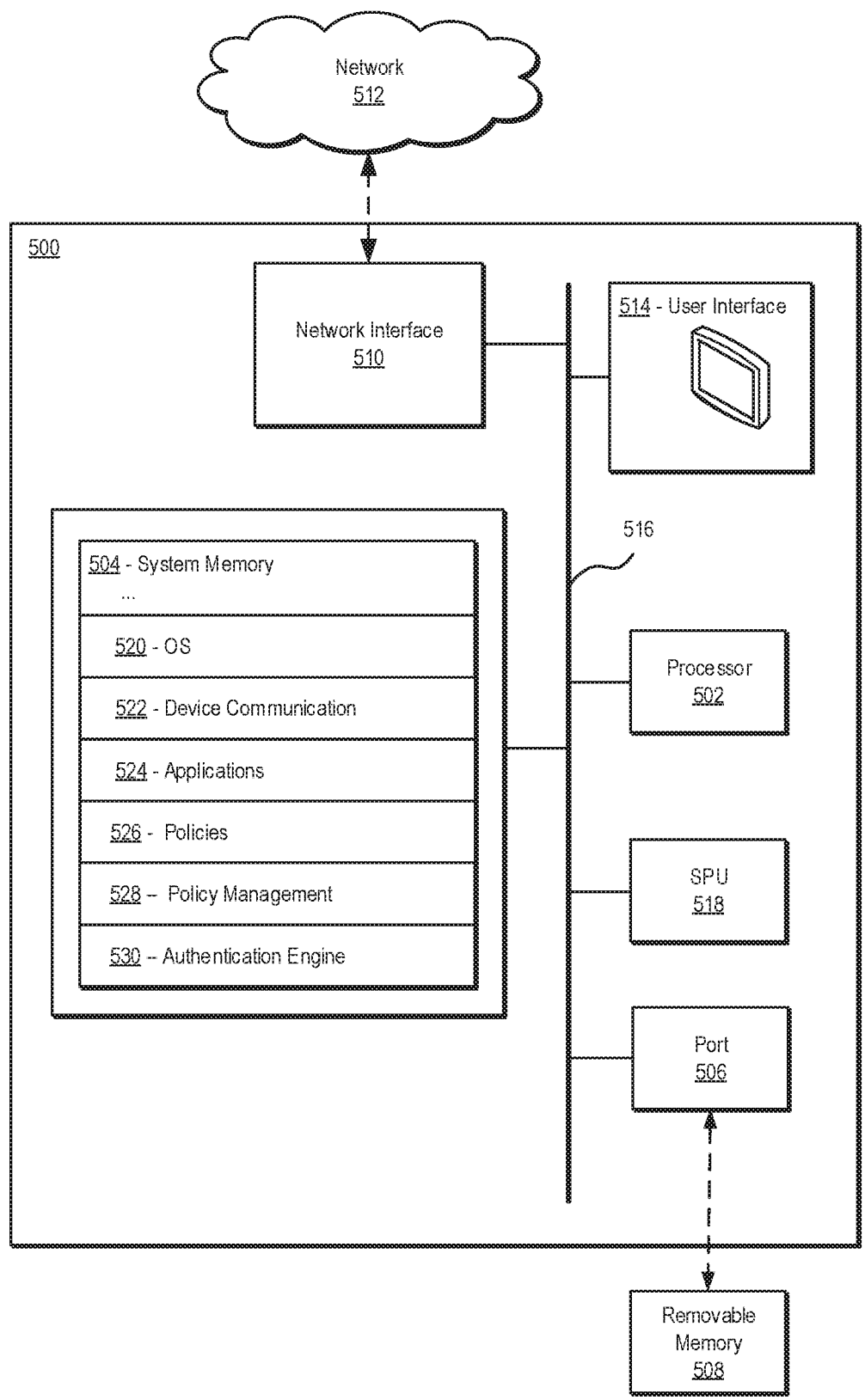
FIG. 5 illustrates an example of a system that may be used to implement certain embodiments of the systems and methods of the present disclosure.

FIG. 5 illustrates a system 500 that may be used to implement certain embodiments of the systems and methods of the present disclosure. Various elements illustrated in the exemplary system 500 may be included in an unmanned vehicle, a system and/or device associated with an unmanned vehicle and/or associated control device, an unmanned vehicle management system, a trusted service, and/or any other system and/or service configured to implement various aspects of embodiments of the disclosed systems and methods.

As illustrated in FIG. 5, the system 500 may include: a processing unit 502; system memory 504, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 502; a port 506 for interfacing with removable memory 508 that may include one or more diskettes, optical storage mediums (e.g., flash memory, thumb drives, USB dongles, compact discs, DVDs, etc.) and/or other non-transitory computer-readable storage mediums; a network interface 510 for communicating with other systems via one or more network connections 512 using one or more communication technologies; a user interface 514 that may include a display and/or one or more input/output devices such as, for example, a touchscreen, a keyboard, a mouse, a track pad, and the like; and one or more busses 516 for communicatively coupling the elements of the system. In certain embodiments, the system 500 may include and/or be associated with one or more sensors and/or subsystems.

In some embodiments, the system 500 may, alternatively or in addition, include an SPU 518 that is protected from tampering by a user of the system or other entities by utilizing secure physical and/or virtual security techniques. An SPU 518 can help enhance the security of sensitive operations including cryptographic signing operations, trusted credential and/or key management, privacy and policy management, and other aspects of the systems and methods disclosed herein. In certain embodiments, the SPU 518 may operate in a logically secure processing domain and be configured to protect and operate on secret, private, and/or otherwise personal information, as described herein. In some embodiments, the SPU 518 may include internal memory storing executable instructions or programs configured to enable the SPU 518 to perform secure operations.

The operation of the system may be generally controlled by the processing unit 502 and/or an SPU 518 operating by executing software instructions and programs stored in the system memory 504 (and/or other computer-readable media, such as removable memory). The system memory 504 may store a variety of executable programs or modules for controlling the operation of the system 500. For example, the system memory 504 may include an operating system ("OS") 520 that may manage and coordinate, at least in part, system hardware resources and provide for common services for execution of various applications and a trust and privacy management system for implementing trust and privacy management functionality including protection and/or management of personal data through management and/or enforcement of associated policies. The system memory may further include, without limitation, communication software 522 configured to enable in part communication with and by the system, one or more applications 524, policies and/or permission information 526 (e.g., policies associated with policy managed locations and/or the like), a policy management engine 528 configured to perform various aspects of the disclosed policy management and/or enforcement operations, an authentication engine 530 configured to perform various aspects of the disclosure operator verification and/or control request authentication operations, and/or any other information, modules, and/or applications configured to implement embodiments of the systems and methods disclosed herein and/or aspects thereof.

The systems and methods disclosed herein are not inherently related to any particular computer, service, device, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for managing the operation of an unmanned vehicle performed by an unmanned vehicle management system comprising a processor and a non-transitory computer readable storage medium storing instructions that, when executed by the processor, cause the processor to perform the method, the method comprising:
    receiving, from the unmanned vehicle, a control request to enter a policy managed location comprising a first digital signature associated with an operator of the unmanned vehicle, location information, and an indication of the policy managed location;
    generating, based on the control request, an authentication request, the authentication request comprising the first digital signature;
    transmitting the authentication request to a trusted service;
    receiving an authentication response from the trusted service;
    identifying a first policy associated with the policy managed location based on the control request;
    generating a control response based on the identified first policy and the authentication response received from the trusted service, wherein the control response indicates whether the unmanned vehicle is permitted to enter the policy managed location; and
    transmitting the control response to the unmanned vehicle.

2. The method of claim 1, wherein the authentication response comprises an indication of a verified identity of the operator of the unmanned vehicle generated by the trusted service based on the first digital signature.

3. The method of claim 1, wherein the authentication response further comprises a second policy associated with the operator of the unmanned vehicle.

4. The method of claim 3, wherein generating the control response is further based on the second policy.

5. The method of claim 1, wherein the first digital signature comprises a digital signature generated using a private cryptographic key associated with the operator of the unmanned vehicle.

6. The method of claim 1, wherein the control request comprises a request to use a subsystem of the unmanned vehicle within the policy managed location.

7. The method of claim 6, wherein the control response indicates whether use of the subsystem of the unmanned vehicle is permitted within the policy managed location.

8. The method of claim 6, wherein the subsystem comprises a sensor system.

9. The method of claim 8, wherein the sensor system comprises a camera system.

10. The method of claim 1, wherein the authentication response comprises a second digital signature associated with the trusted service.

11. The method of claim 10, wherein the generated control response comprises the second digital signature.

12. The method of claim 1, wherein the location information comprises an indication of a current location of the unmanned vehicle.

13. The method of claim 1, wherein the location information comprises an indication of a proposed location of the unmanned vehicle.

14. The method of claim 1, wherein the location information comprises an indication of a proposed path of travel of the unmanned vehicle.

15. The method of claim 1, wherein the unmanned vehicle comprises at least one of an aerial vehicle, a land vehicle, an overwater vessel and an underwater vessel.

* * * * *